United States Patent
Bok et al.

(10) Patent No.: US 12,471,610 B1
(45) Date of Patent: Nov. 18, 2025

(54) FOOD COMPOSITION FOR REDUCING ALCOHOLIC HANGUP CONTAINING PLANT EXTRACT

(71) Applicant: Bionutrigen Co., Ltd., Daejeon (KR)

(72) Inventors: Song Hae Bok, Daejeon (KR); Eun Eai Kim, Daejeon (KR); Myung Sun Jung, Daejeon (KR)

( * ) Notice: Subject to any disclaimer, the term of this patent is extended or adjusted under 35 U.S.C. 154(b) by 0 days.

(21) Appl. No.: 19/245,319

(22) Filed: Jun. 21, 2025

(30) Foreign Application Priority Data

Jun. 27, 2024 (KR) ............. 10-2024-0084296

(51) Int. Cl.
| | | |
|---|---|---|
| A23L 2/52 | (2006.01) | |
| A23L 2/02 | (2006.01) | |
| A23L 19/00 | (2016.01) | |
| A23L 21/25 | (2016.01) | |
| A61K 36/15 | (2006.01) | |
| A61K 36/185 | (2006.01) | |
| A61K 36/282 | (2006.01) | |
| A61K 36/44 | (2006.01) | |
| A61K 36/48 | (2006.01) | |
| A61K 36/481 | (2006.01) | |
| A61K 36/484 | (2006.01) | |
| A61K 36/53 | (2006.01) | |
| A61K 36/54 | (2006.01) | |
| A61K 36/725 | (2006.01) | |
| A61K 36/73 | (2006.01) | |
| A61K 36/752 | (2006.01) | |
| A61K 36/79 | (2006.01) | |
| A61K 36/815 | (2006.01) | |
| A61K 36/88 | (2006.01) | |
| A61K 36/8962 | (2006.01) | |

(52) U.S. Cl.
CPC .......... *A23L 2/52* (2013.01); *A23L 2/02* (2013.01); *A23L 19/09* (2016.08); *A23L 21/25* (2016.08); *A61K 36/15* (2013.01); *A61K 36/185* (2013.01); *A61K 36/282* (2013.01); *A61K 36/44* (2013.01); *A61K 36/48* (2013.01); *A61K 36/481* (2013.01); *A61K 36/484* (2013.01); *A61K 36/53* (2013.01); *A61K 36/54* (2013.01); *A61K 36/725* (2013.01); *A61K 36/73* (2013.01); *A61K 36/752* (2013.01); *A61K 36/79* (2013.01); *A61K 36/815* (2013.01); *A61K 36/88* (2013.01); *A61K 36/8962* (2013.01)

(58) Field of Classification Search
None
See application file for complete search history.

(56) References Cited

FOREIGN PATENT DOCUMENTS

| KR | 10-2006-0117550 | 11/2006 | |
|---|---|---|---|
| KR | 10-2011-0005474 | 1/2011 | |
| KR | 10-2011-0115862 | 10/2011 | |
| KR | 10-2017-0052868 | 5/2017 | |
| KR | 10-2229323 | 3/2021 | |
| KR | 10-2021-0148640 | 12/2021 | |
| KR | 102637880 B1 * | 2/2024 | ............... A23L 2/04 |

OTHER PUBLICATIONS

English Specification of 10-2011-0005474.
English Specification of 10-2017-0052868.
English Specification of 10-2229323.
English Specification of 10-2006-0117550.
English Specification of 10-2021-0148640.
English Specification of 10-2011-0115862.

* cited by examiner

*Primary Examiner* — Nghi V Nguyen
(74) *Attorney, Agent, or Firm* — ANTONIO HA & U.S. PATENT, LLC

(57) ABSTRACT

The present disclosure provides a food composition for alleviating hangover comprising plant extracts, comprising 9 weight percent of persimmon extract solution, 9 weight percent of citrus peel extract solution, 9 weight percent of mugwort extract solution, 10 weight percent of goji berry extract solution, 9 weight percent of buckwheat extract solution, 9 weight percent of onion extract solution, 9 weight percent of arrowroot extract solution, 8 weight percent of soybean sprout extract solution, 8 weight percent of licorice extract solution, 4 weight percent of *Astragalus* extract solution, 4 weight percent of *Schisandra* extract solution, 4 weight percent of jujube extract solution, 4 weight percent of citron peel extract solution, and 4 weight percent of lemon peel extract solution.

3 Claims, No Drawings

FOOD COMPOSITION FOR REDUCING ALCOHOLIC HANGUP CONTAINING PLANT EXTRACT

CROSS-REFERENCE TO RELATED APPLICATION(S)

This application claims priority to Korean Patent Application No. 10-2024-0084296 filed in the Korean Intellectual Property Office on Jun. 27, 2024 the disclosure of which is incorporated by reference herein in its entirety.

TECHNICAL FIELD

The present disclosure relates to a food composition for alleviating hangover comprising plant extracts, and more specifically, to a food composition for alleviating hangover comprising plant extracts, which can relieve hangover by significantly lowering the blood alcohol concentration upon ingestion.

DISCUSSION OF RELATED ART

Hangover refers to a general term for physical and mental discomfort that occurs after drinking alcohol, and objective symptoms include cognitive impairment, nausea, vomiting, drowsiness, headache, reduced motor ability, hematological changes, and hormonal changes.

Since ancient times, alcohol has accompanied human history and has been widely used in daily life as a drug or recreational food.

Alcohol, which is the main component of alcoholic beverages, exhibits various pharmacological effects upon ingestion, including stimulation of appetite, promotion of blood circulation, elevation of body temperature, relief of stress, and induction of sleep; however, it also causes side effects such as addiction, habituation, and dependence on alcohol.

Alcohol may cause various health problems, not only digestive issues such as gastritis, gastric ulcer, alcoholic hepatitis, and alcoholic fatty liver, but also myocardial infarction and hypertension, and may act as a causative substance of alcoholic dementia, alcohol addiction, and other health disorders.

Excessive stress and inappropriate drinking habits cause not only health problems but also contribute to various crimes, youth problems, and traffic accidents, thereby resulting in social, economic, and personal damages, so appropriate use of alcohol is required.

Alcohol is absorbed and metabolized in the liver, mainly through the pathway of alcohol dehydrogenase (ADH). Alcohol is converted into acetaldehyde by ADH, and acetaldehyde is a toxic substance that may cause damage to cell walls and cell necrosis, and may also cause hangover symptoms when a large amount of alcohol is consumed.

Acetaldehyde is decomposed into acetate by acetaldehyde dehydrogenase (ALDH), and is finally decomposed into $CO_2$ and $H_2O$ or enters the citric acid cycle for energy production.

However, when alcohol is consumed excessively, alcohol and NADH, which is generated from nicotinamide adenine dinucleotide (NAD), enter the mitochondria and may disrupt the redox balance in the liver. As a result, cholesterol may accumulate in the liver, protein synthesis may decrease, and fatty liver and hyperlipidemia may occur.

In addition, acetaldehyde induces the accumulation of fatigue substances such as lactic acid, inhibits vitamin activation, reduces the amount of vitamins in the blood, and releases a large amount of water and various electrolytes out of the body through urine and sweat, which may cause thirst, headache, and lethargy.

Due to the characteristics of Korean drinking culture, many people experience difficulty in engaging in normal daily activities the day after frequent or excessive drinking, and bad drinking habits may ultimately deteriorate health.

Based on the social background of Korean drinking culture, the demand for products for relieving hangover continues among consumers, and various studies and experiments are being conducted in various fields to reduce hangover caused by alcohol consumption, and in fact, a variety of products are being sold on the market or are newly emerging.

Most of the products use various substances with excellent efficacy, including herbal ingredients, but they have low reliability overall because the amount used is insufficient and the efficacy of the final product lacks objective verification.

Therefore, it is urgently required to develop a product that can objectively verify the hangover-relieving effect, secure consumer trust, and help healthy life by reducing social damage caused by excessive drinking.

Korean Laid-open Patent Publication No. 10-2011-0115862 (published on Oct. 24, 2011) discloses a composition for reliving and preventing hangover and beverage comprising composition.

The composition for relieving and preventing hangover is effective for hangover prevention, but has a disadvantage in that it is insufficient in relieving hangover.

SUMMARY

An object of the present disclosure is to provide a food composition for alleviating hangover comprising plant extracts, which can relieve hangover by significantly lowering the blood alcohol concentration upon ingestion.

Another object of the present disclosure is to provide a food composition for alleviating hangover comprising plant extracts, which has excellent taste even though it does not contain sugar.

To achieve the above object, the present disclosure provides the following means.

The present disclosure provides a food composition for alleviating hangover comprising plant extracts, comprising 9 weight percent of persimmon extract solution, 9 weight percent of citrus peel extract solution, 9 weight percent of mugwort extract solution, 10 weight percent of goji berry extract solution, 9 weight percent of buckwheat extract solution, 9 weight percent of onion extract solution, 9 weight percent of arrowroot extract solution, 8 weight percent of soybean sprout extract solution, 8 weight percent of licorice extract solution, 4 weight percent of *Astragalus* extract solution, 4 weight percent of *Schisandra* extract solution, 4 weight percent of jujube extract solution, 4 weight percent of citron peel extract solution, and 4 weight percent of lemon peel extract solution.

1 to 3 parts by weight of a hangover alleviating promoter are additionally included in 100 parts by weight of the food composition for alleviating hangover comprising the plant extracts. The hangover alleviating promoter comprises 70 weight percent of fermented lotus seed solution, 10 weight percent of pine needle extract solution, 10 weight percent of cinnamon extract solution, and 10 weight percent of Chinese artichoke extract solution. The fermented lotus seed solution is prepared by adding 20 parts by weight of banana to 100 parts by weight of purified water and heating at 105° C. for 30 minutes to obtain a banana extract solution, adding 10 parts by weight of lotus seed to 100 parts by weight of the banana extract solution and immersing for 1 hour to obtain a lotus seed immersion solution, adding 3 parts by weight of alpha-amylase to 100 parts by weight of the lotus seed immersion solution and enzymatically treating at 40° C. for 2 hours, and adding 10 parts by weight of fermented blackberry solution to 100 parts by weight of the enzymatically treated lotus seed immersion solution, fermenting at 30° C. for 10 hours, and filtering, and the fermented blackberry solution is prepared by mixing 60 weight percent of blackberry juice and 40 weight percent of allulose and fermenting at 30° C. for 5 days.

The pine needle extract solution is prepared by adding 50 parts by weight of 60% ethanol (v/v) to 1 part by weight of pine needle and ethanol-extracting for 24 hours. The cinnamon extract solution is prepared by adding 10 parts by weight of purified water to 1 part by weight of cinnamon and heating at 105° C. for 3 hours. The Chinese artichoke extract solution is prepared by adding 10 parts by weight of purified water to 1 part by weight of Chinese artichoke and heating at 105° C. for 5 hours.

to 1 part by weight of a palatability enhancer is additionally included in 100 parts by weight of a food composition for alleviating hangover comprising plant extracts.

The palatability enhancer comprises 50 weight percent of honey extract solution, 30 weight percent of strawberry extract solution, 10 weight percent of fermented lemon balm solution, 5 weight percent of fructo-oligosaccharide, 3 weight percent of allulose, and 2 weight percent of xylose. The honey extract solution is prepared by adding 500 parts by weight of purified water, 20 parts by weight of bamboo leaves, 10 parts by weight of apple, and 10 parts by weight of pear to 100 parts by weight of honey, and heating at 95° C. for 1 hour. The strawberry extract solution is prepared by immersing strawberries in magnetized water at 20° C. for 10 minutes, and adding 1,000 parts by weight of *Aronia* extract solution to 100 parts by weight of the strawberries immersed in the magnetized water, reflux-extracting at 90° C. for 4 hours, and filtering. The *Aronia* extract solution is prepared by adding 800 parts by weight of purified water to 100 parts by weight of *Aronia*, reflux-extracting for 5 hours, and filtering. The fermented lemon balm solution is prepared by adding 900 parts by weight of purified water to 100 parts by weight of lemon balm, heating at 100° C. for 30 minutes, and filtering to obtain a lemon balm extract solution, and adding 10 parts by weight of fermented blueberry solution to 100 parts by weight of the lemon balm extract solution, fermenting at 25° C. for 10 hours, and filtering, and the fermented blueberry solution is prepared by mixing 50 weight percent of blueberry and 50 weight percent of isomalto-oligosaccharide, and fermenting at 25° C. for 3 days.

0.5 to 2 parts by weight of a natural preservative are additionally included in 100 parts by weight of a food composition for alleviating hangover comprising plant extracts. The natural preservative comprises 80 weight percent of fermented garlic solution and 20 weight percent of fermented deodeok solution. The fermented garlic solution is prepared by adding 600 parts by weight of purified water to 100 parts by weight of garlic, heating at 120° C. for 20 minutes, and filtering to obtain a garlic extract solution, and adding 3 parts by weight of fermented raspberry solution to 100 parts by weight of the garlic extract solution, fermenting at 25° C. for 10 hours, and filtering, and the fermented raspberry solution is prepared by mixing 100 parts by weight of raspberry juice and 10 parts by weight of yeast, and fermenting at 30° C. for 24 hours. The fermented deodeok solution is prepared by adding 200 parts by weight of ginkgo leaf extract solution to 100 parts by weight of deodeok, extracting at 1.5 atm and 100° C. for 2 hours to obtain a deodeok extract solution, and adding 10 parts by weight of Korean black raspberry starter to 100 parts by weight of the deodeok extract solution, fermenting at 25° C. for 10 hours, and filtering, the ginkgo leaf extract solution is prepared by adding 800 parts by weight of 90% ethanol (v/v) to 100 parts by weight of ginkgo leaves, standing at 15° C. for 12 hours, and filtering, and the Korean black raspberry starter is prepared by adding 100 mL of sterilized water to 100 g of Korean black raspberry, pulverizing with a grinder, juicing, and filtering to obtain a Korean black raspberry extract solution, preparing a medium by mixing corn flour and galactose at a weight ratio of 1:1, and adding 50 parts by weight of the Korean black raspberry extract solution to 100 parts by weight of the medium and fermenting at 25° C. for 10 days.

The food composition for alleviating hangover comprising plant extracts according to the present disclosure has an advantage in that it can relieve hangover by significantly lowering the blood alcohol concentration upon ingestion.

In addition, the food composition for alleviating hangover comprising plant extracts of the present disclosure has an advantage in that it has excellent taste even though it does not contain sugar.

DETAILED DESCRIPTION OF EXEMPLARY EMBODIMENTS

Hereinafter, the present disclosure will be described in detail as follows.

First, a food composition for alleviating hangover comprising plant extracts according to the present disclosure will be introduced.

The food composition for alleviating hangover comprising plant extracts of the present invention may comprise 9 weight percent of persimmon extract solution, 9 weight percent of citrus peel extract solution, 9 weight percent of mugwort extract solution, 10 weight percent of goji berry extract solution, 9 weight percent of buckwheat extract solution, 9 weight percent of onion extract solution, 9 weight percent of arrowroot extract solution, 8 weight percent of soybean sprout extract solution, 8 weight percent of licorice extract solution, 4 weight percent of *Astragalus* extract solution, 4 weight percent of *Schisandra* extract solution, 4 weight percent of jujube extract solution, 4 weight percent of citron peel extract solution, and 4 weight percent of lemon peel extract solution.

The present disclosure can provide a food composition for alleviating hangover comprising plant extracts, which has a much greater hangover alleviating effect compared to conventional products due to a significant synergistic effect when the above components are combined at the above ratios.

The extract solutions are preferably obtained by hot water extraction.

The persimmon is one of the fruits that are widely known to have very high nutritional value. Compared to other fruits, the persimmon contains relatively less moisture, and its sugars are mainly composed of glucose and fructose, accounting for about 14%. It contains a large amount of vitamin A, approximately 400 IU per 100 g, and also contains a high amount of vitamin C. In particular, persimmon leaves contain vitamin C in an amount of 500 mg per 100 g in young leaves and 200 mg per 100 g in mature leaves, which is significantly higher than that in fruits such as strawberries and citrus fruits. In particular, the vitamin C contained in the persimmon is a vitamin C precursor, and unlike general vitamin C, it is not easily destroyed when exposed to heat, water, or air. In addition, persimmon leaves contain a component called rutin, which performs functions such as hemostasis and blood pressure reduction. The component that causes an astringent taste in the persimmon is tannin. An unripe persimmon has an astringent taste, while a fully ripe persimmon, a soaked persimmon, or a dried persimmon has a sweet taste. This is because water-soluble tannins become insoluble, making the astringent taste undetectable. The persimmon is also beneficial for gastrointestinal disorders such as gastric ulcers and diarrhea. This is due to the strong astringent action of tannic acid abundantly contained in the persimmon. Astringent action refers to the contraction of tissue, and in the body, it contracts the mucosal tissue surface to stop diarrhea and alleviate symptoms of gastric ulcers. In addition, the tannic acid has a hemostatic function, making it effective for people with cerebral hemorrhage symptoms, and it also strengthens capillaries, making it highly useful in the prevention and treatment of circulatory system diseases such as hypertension. In particular, persimmon leaves contain a blood pressure-lowering substance called rutin, and also have a diuretic effect, so drinking it as tea is beneficial for people with hypertension, heart disease, or kidney disease. The persimmon is also effective for alleviating hangover. Approximately 10% of alcohol absorbed into the body is excreted through urine and respiration, and the rest must be oxidized and decomposed. The components that help with the oxidative decomposition of alcohol are fructose and vitamin C, both of which are abundant in the persimmon, making it useful for the prevention and treatment of hangover.

The citrus peel contains large amounts of active flavonoid compounds such as narirutin and hesperidin, which increase antioxidant activity in the body and suppress inflammation, thereby preventing alcoholic liver disease and inhibiting alcoholic fatty liver. They also promote the regeneration of damaged liver cells and enhance detoxification function, thereby protecting liver function. In addition, as powerful antioxidants, they effectively remove large amounts of reactive oxygen species generated during the metabolic process of alcohol in which alcohol is decomposed into acetaldehyde, thereby diluting toxicity, and promote the activity of alcohol-decomposing enzymes to help decompose alcohol in the body.

The mugwort refers to a genus of *Artemisia* in the family Asteraceae of the order Campanulales, and includes various types such as Ganghwa mugwort, Hwanghae mugwort, and perennial mugwort. The mugwort contains a large amount of dietary fiber, vitamins, and minerals that are beneficial to the human body, and is widely used as food. In addition, it is also useful for medicinal purposes due to its efficacy in treating gastric disorders, constipation, neuralgia, arthritis, cold syndrome, asthma, hepatitis, eczema, and skin itching. It is known that the mugwort exhibits remarkable efficacy in acute and chronic hepatitis, as well as in fatty liver, liver cirrhosis, and liver cancer.

The goji berry refers to the fruit of *Lycium chinense*, a deciduous broadleaf shrub of the nightshade family, and is naturally found throughout Korea. In traditional Korean medicine, the leaf is called gugiyeop, the fruit is called gugija, and the root is called jigolpi. It contains amino acids and vitamins, and is used for improving sexual vitality, treating conjunctivitis, relieving fatigue, and alleviating dizziness. The goji berry has traditionally been regarded as a miraculous medicine for longevity, and is known to be effective for invigorating the body, restoring vitality, and improving digestive function. It is also reported to be beneficial for improving weak constitution and alleviating dizziness. The goji berry contains vitamins, rutin, betaine, and amino acids, and is known to have excellent efficacy as a tonic, and to be effective in the prevention of arteriosclerosis and hypertension.

It is preferably to use both the leaves and fruits of the goji berry.

The buckwheat is rich in protein, carbohydrates, potassium, folic acid, magnesium, dietary fiber, and eight essential amino acids, which help maintain the nervous system and are effective in lowering cholesterol levels in the blood. In addition, the component choline in the buckwheat is also helpful for alleviating hangover. Furthermore, rutin, which is a representative component of the buckwheat and a type of flavonoid glycoside, is known to strengthen blood vessels and to be effective for patients with hypertension.

The onion contains a high amount of nutrients such as protein, carbohydrates, vitamin C, calcium, phosphorus, and iron, although its moisture accounts for 90% of its total content. In particular, quercetin, a component of the onion, inhibits the accumulation of fat and cholesterol in blood vessels, thereby helping to prevent hypertension. In addition, quercetin protects cells from being attacked by reactive oxygen species and lipid peroxides, and is effective in healing cellular inflammation and damage. The onion is also rich in chromium, a trace mineral that helps maintain glucose metabolism homeostasis, thereby promoting insulin activity and aiding in blood sugar control. In addition, allicin contained in the onion acts as a sedative, promotes the release of nitric oxide to reduce vascular rigidity and lower blood pressure, and helps prevent platelet aggregation and facilitates fibrinolysis in blood vessels, thereby reducing the risk of thrombosis and stroke. Furthermore, the onion contains a large amount of glutathione, which assists in the absorption of vitamin B1 consumed when drinking alcohol and promotes the breakdown of fat in the liver, making it effective in alleviating hangover.

The arrowroot (*Pueraria thunbergiana*) is a perennial vine, and the root of the arrowroot contains isoflavone compounds such as daidzein, daidzin, puerarin, puerarin xyloside, luteolin, and biochanin A, as well as starch and coumarin. The isoflavone compounds in the root have a sedative effect, and daidzein is effective for migraine, hypertension, and angina pectoris.

The soybean sprout contains a large amount of protein and fat, and also contains a high amount of vitamin B1, vitamin B2, and ascorbic acid (vitamin C), making it a highly nutritious food. During the germination period, the overall compositional change includes a rapid decrease in simple sugars, a slight decrease in protein, and an increase in dietary fiber and amino acids.

Aspartic acid, which is a type of amino acid contained in the soybean sprout, is known to be excellent for alleviating hangover by helping recover liver function and promoting rapid alcohol detoxification in the body. Aspartic acid is abundantly present in the root hairs of the soybean sprout, and for the purpose of alleviating hangover, it is necessary to consume the root hairs without trimming. In addition, the soybean sprout helps prevent and treat colds, and as a low-calorie food, it is not only good for dieting but also effective in preventing constipation by blocking the accumulation of waste in the intestines due to its rich dietary fiber content. In addition, it is very beneficial for liver health due to its richness in mineral components such as methionine and saponin.

The licorice (*Glycyrrhiza glabra*) is a plant used as a traditional herbal medicine, and contains triterpene saponins, glycyrrhizin, liquiritin, asparagine, glutamic acid, and glucose. Glycyrrhizin, which is a 2-glucuronic acid glycoside of glycyrrhizic acid, the sweet-tasting component of the licorice, exhibits detoxification activity not only against drug intoxication, plant intoxication, or endogenous metabolic toxins, but also has antibacterial and disinfectant effects.

*Astragalus* is a perennial plant belonging to the legume family, and is also called Danneosam. It contains components such as flavonoids, saponins, alkaloids, and amino acids. Its taste is sweet, and its nature is warm. In terms of efficacy, it is recorded to reinforce energy (qi), strengthen the constitution, stabilize the mind, and dilate skin blood vessels, thereby promoting blood circulation. It is also known to enhance the resistance of capillaries, to be effective for sweating caused by physical weakness, to strengthen the function of internal organs, and to stop diarrhea.

*Schisandra* is the fruit of the *Schisandra* tree (*Schisandra chinensis*), a deciduous climbing shrub belonging to the *magnolia* family, and has a red color with a diameter of approximately 1 cm. It is called *Schisandra* because it has five distinct tastes: sweet, sour, bitter, salty, and pungent, among which the sour taste is the strongest. *Schisandra* contains components such as malic acid, gomisin, and citric acid, which strengthen the heart, lower blood pressure, and enhance immunity. It also strengthens lung function and has antitussive and expectorant effects, thereby helping to treat cough and thirst. In animal experiments, it was shown to stimulate cerebral nerves, exhibit tonic effects, and promote hepatic metabolism. According to recent clinical reports, *Schisandra* has been found to be effective even for acute icteric infectious hepatitis. In addition, *Schisandra* is known to increase high-density lipoprotein (HDL) cholesterol, reduce triglycerides and low-density lipoprotein (LDL) cholesterol, and inhibit the growth of *Eubacterium*, an intestinal bacterium associated with obesity, thereby exhibiting efficacy against obesity.

Jujube (Zizyphus jujuba Mill.) has traditionally been used in Korean medicine not only as a tonic, but also to restore the function of weakened internal organs, to strengthen the entire body, and is known to be effective in treating sedation, anti-aging, neurasthenia, loss of appetite, and cold syndrome in women. In addition, jujube is known to have effects such as relieving indigestion, exhibiting anti-allergic activity, and protecting the liver, and is also reported to be effective in treating tuberculosis, bronchitis, and neurasthenia.

Citron (Yuja citron) contains a large amount of components beneficial for enhancing resistance and immunity, such as vitamin C, citric acid, and folic acid, compared to other fruits. In particular, the content of vitamin C, an antioxidant referred to as a natural anti-cancer agent, is known to be the highest among fruits harvested in late autumn. In particular, unlike other citrus fruits such as grapefruit, mandarin, and orange, in which mainly the pulp is used, it has been found that the citron contains various bioactive components not only in the pulp but also in the peel, including crude fat, crude fiber, niacin, vitamin B1, vitamin C, citric acid (also known as citrate), limonene, and pectin.

Lemon originates from the Himalayas and grows well in relatively cool regions with stable climates. It is widely cultivated in countries such as Italy, Spain, the state of California in the United States, and Australia, with the highest quality lemons known to be those grown in the Mediterranean coastal region. It has a strong sour taste due to its high content of vitamin C and citric acid. Lemon oil is extracted from the peel and used as a raw material for beverages, perfumes, and lemonade, while the juice is used as a raw material for beverages, vinegar, and cosmetics, and is also used as a flavoring agent in confectionery.

The food composition for alleviating hangover comprising plant extracts according to the present disclosure has an advantage in that it can relieve hangover by significantly lowering the blood alcohol concentration upon ingestion.

In addition, the food composition for alleviating hangover comprising plant extracts of the present disclosure has an advantage in that it has excellent taste even though it does not contain sugar.

The present disclosure may additionally include 1 to 3 parts by weight of a hangover alleviating promoter in 100 parts by weight of the food composition for alleviating hangover comprising the plant extracts.

The hangover alleviating promoter may comprise 70 weight percent of fermented lotus seed solution, 10 weight percent of pine needle extract solution, 10 weight percent of cinnamon extract solution, and 10 weight percent of Chinese artichoke extract solution;

The fermented lotus seed solution may be prepared by adding 20 parts by weight of banana to 100 parts by weight of purified water and heating at 105° C. for 30 minutes to obtain a banana extract solution, adding 10 parts by weight of lotus seed to 100 parts by weight of the banana extract solution and immersing for 1 hour to obtain a lotus seed immersion solution, adding 3 parts by weight of alpha-amylase to 100 parts by weight of the lotus seed immersion solution and enzymatically treating at 40° C. for 2 hours, and adding 10 parts by weight of fermented blackberry solution to 100 parts by weight of the enzymatically treated lotus seed immersion solution, fermenting at 30° C. for 10 hours, and filtering.

The fermented blackberry solution may be prepared by mixing 60 weight percent of blackberry juice and 40 weight percent of allulose and fermenting at 30° C. for 5 days.

The pine needle extract solution may be prepared by adding 50 parts by weight of 60% ethanol (v/v) to 1 part by weight of pine needle and ethanol-extracting for 24 hours.

The cinnamon extract solution may be prepared by adding 10 parts by weight of purified water to 1 part by weight of cinnamon and heating at 105° C. for 3 hours.

The Chinese artichoke extract solution may be prepared by adding 10 parts by weight of purified water to 1 part by weight of Chinese artichoke and heating at 105° C. for 5 hours.

The present disclosure may additionally include 0.1 to 1 parts by weight of a palatability enhancer in 100 parts by weight of the food composition for alleviating hangover comprising the plant extracts.

The palatability enhancer may comprise 50 weight percent of honey extract solution, 30 weight percent of strawberry extract solution, 10 weight percent of fermented lemon balm solution, 5 weight percent of fructo-oligosaccharide, 3 weight percent of allulose, and 2 weight percent of xylose.

The honey extract solution may be prepared by adding 500 parts by weight of purified water, 20 parts by weight of bamboo leaves, 10 parts by weight of apple, and 10 parts by weight of pear to 100 parts by weight of honey, and heating at 95° C. for 1 hour;

The strawberry extract solution may be prepared by immersing strawberries in magnetized water at 20° C. for 10 minutes, and adding 1,000 parts by weight of *Aronia* extract solution to 100 parts by weight of the strawberries immersed in the magnetized water, reflux-extracting at 90° C. for 4 hours, and filtering.

The magnetized water may be prepared by placing purified water in a sealed container and applying a pulsed magnetic field having a magnetic field strength of 500 gauss and a frequency of 8 hertz per second for 30 minutes, thereby allowing water molecules to form clusters.

The *Aronia* extract solution may be prepared by adding 800 parts by weight of purified water to 100 parts by weight of *Aronia*, reflux-extracting for 5 hours, and filtering.

The fermented lemon balm solution may be prepared by adding 900 parts by weight of purified water to 100 parts by weight of lemon balm, heating at 100° C. for 30 minutes, and filtering to obtain a lemon balm extract solution, and adding 10 parts by weight of fermented blueberry solution to 100 parts by weight of the lemon balm extract solution, fermenting at 25° C. for 10 hours, and filtering.

The fermented blueberry solution may be prepared by mixing 50 weight percent of blueberry and 50 weight percent of isomalto-oligosaccharide, and fermenting at 25° C. for 3 days.

The present disclosure may additionally include 0.5 to 2 parts by weight of a natural preservative in 100 parts by weight of the food composition for alleviating hangover comprising the plant extracts.

The natural preservative may comprise 80 weight percent of fermented garlic solution and 20 weight percent of fermented deodeok solution.

The fermented garlic solution may be prepared by adding 600 parts by weight of purified water to 100 parts by weight of garlic, heating at 120° C. for 20 minutes, and filtering to obtain a garlic extract solution, and adding 3 parts by weight of fermented raspberry solution to 100 parts by weight of the garlic extract solution, fermenting at 25° C. for 10 hours, and filtering.

The fermented raspberry solution may be prepared by mixing 100 parts by weight of raspberry juice and 10 parts by weight of yeast, and fermenting at 30° C. for 24 hours.

The fermented deodeok solution may be prepared by adding 200 parts by weight of ginkgo leaf extract solution to 100 parts by weight of deodeok, extracting at 1.5 atm and 100° C. for 2 hours to obtain a deodeok extract solution, and adding 10 parts by weight of Korean black raspberry starter to 100 parts by weight of the deodeok extract solution, fermenting at 25° C. for 10 hours, and filtering.

The ginkgo leaf extract solution may be prepared by adding 800 parts by weight of 90% ethanol (v/v) to 100 parts by weight of ginkgo leaves, standing at 15° C. for 12 hours, and filtering.

The Korean black raspberry starter may be prepared by adding 100 mL of sterilized water to 100 g of Korean black raspberry, pulverizing with a grinder, juicing, and filtering to obtain a Korean black raspberry extract solution, preparing a medium by mixing corn flour and galactose at a weight ratio of 1:1, and adding 50 parts by weight of the Korean black raspberry extract solution to 100 parts by weight of the medium and fermenting at 25° C. for 10 days.

The composition according to the present disclosure may be manufactured and processed in any one dosage form selected from the group consisting of tablets, granules, powders, capsules, liquid solutions, and pills.

The composition according to the present disclosure has no cytotoxicity or side effects, and significantly enhances alcohol dehydrogenase (ADH) activity and aldehyde dehydrogenase (ALDH) activity in cells, thereby remarkably improving the ability to degrade alcohol and acetaldehyde, and exhibiting excellent effects in preventing and alleviating hangover.

According to another aspect of the present disclosure, there is provided a functional food for preventing and alleviating hangover, comprising the composition.

In the present disclosure, the functional food refers to a food that is manufactured and processed using ingredients or components having beneficial functionality for the human body in accordance with the Act on Health Functional Foods of Korea, and the functionality may refer to the effect of adjusting nutrients or providing physiological benefits for health purposes related to the structure and function of the human body.

In the present disclosure, the functional food may include general food additives, and the suitability of the food additives may be determined, unless otherwise specified, based on the specifications and standards for the corresponding items in accordance with the General Provisions and General Test Methods of the Food Additive Code approved by the Ministry of Food and Drug Safety of Korea.

In the present disclosure, the functional food may be variously applied to foods and beverages for preventing and alleviating hangover, and may be used in various products such as food products, beverages, teas, granules, pills, multivitamin formulations, health functional supplements, and food additives.

Hereinafter, examples will be provided to describe the configuration and effects of the present disclosure in more detail. These examples are provided solely for illustrative purposes, and the scope of the present disclosure is not limited thereto.

Example 1

The food composition for alleviating hangover comprising plant extracts was prepared by mixing 9 weight percent of persimmon extract solution, 9 weight percent of citrus peel extract solution, 9 weight percent of mugwort extract solution, 5 weight percent of goji leaf extract solution, 5 weight percent of goji berry extract solution, 9 weight percent of buckwheat extract solution, 9 weight percent of onion extract solution, 9 weight percent of arrowroot extract solution, 8 weight percent of soybean sprout extract solution, 8 weight percent of licorice (*Glycyrrhiza glabra*) extract solution, 4 weight percent of *Astragalus* extract solution, 4 weight percent of *Schisandra* extract solution, 4 weight percent of jujube extract solution, 4 weight percent of citron peel extract solution, and 4 weight percent of lemon peel extract solution.

The persimmon extract solution was prepared by adding 10 parts by weight of purified water to 1 part by weight of persimmon, heating at 95° C. for 1 hour, and then filtering. The extract solutions of the other components were also prepared in the same manner as the persimmon extract solution.

Example 2 parts by weight of a hangover alleviating promoter were additionally mixed into 100 parts by weight of the food composition for alleviating hangover comprising plant extracts prepared in Example 1.

The hangover alleviating promoter was prepared by mixing 70 weight percent of fermented lotus seed solution, 10 weight percent of pine needle extract solution, 10 weight percent of cinnamon extract solution, and 10 weight percent of Chinese artichoke extract solution.

The fermented lotus seed solution was prepared by adding 20 parts by weight of banana to 100 parts by weight of purified water, heating at 105° C. for 30 minutes to obtain a banana extract solution, adding 10 parts by weight of lotus seed to 100 parts by weight of the banana extract solution and immersing for 1 hour to obtain a lotus seed immersion solution, adding 3 parts by weight of alpha-amylase to 100 parts by weight of the lotus seed immersion solution and performing enzymatic treatment at 40° C. for 2 hours, and adding 10 parts by weight of fermented blackberry solution to 100 parts by weight of the enzyme-treated lotus seed immersion solution, fermenting at 30° C. for 10 hours, and filtering.

The fermented blackberry solution was prepared by mixing 60 weight percent of blackberry juice and 40 weight percent of allulose and fermenting at 30° C. for 5 days;

The pine needle extract solution was prepared by adding 50 parts by weight of 60% ethanol (v/v) to 1 part by weight of pine needle and ethanol-extracting for 24 hours.

The cinnamon extract solution was prepared by adding 10 parts by weight of purified water to 1 part by weight of cinnamon and heating at 105° C. for 3 hours.

The Chinese artichoke extract solution was prepared by adding 10 parts by weight of purified water to 1 part by weight of Chinese artichoke and heating at 105° C. for 5 hours.

Comparative Example 1

The composition for alleviating hangover was prepared by mixing 17 weight percent of arrowroot extract solution, 10 weight percent of hawthorn extract solution, 10 weight percent of Xanthium extract solution, 10 weight percent of Hovenia dulcis fruit, 6 weight percent of jujube extract solution, 4 weight percent of ganghwa extract solution, 4 weight percent of citrus unshiu peel extract solution, 4 weight percent of thistle extract solution, 4 weight percent of goji berry extract solution, 4 weight percent of longan aril extract solution, 4 weight percent of quince extract solution, 4 weight percent of mulberry twig extract solution, 4 weight percent of yam extract solution, 4 weight percent of arrowroot flower extract solution, 3 weight percent of barley sprout extract solution, 2 weight percent of licorice extract solution, and 6 weight percent of honey extract solution.

The arrowroot extract solution was prepared by adding 10 parts by weight of purified water to 1 part by weight of arrowroot, heating at 95° C. for 1 hour, and then filtering. The extract solutions of the other components were also prepared in the same manner as the arrowroot extract solution.

Experimental Example 1

An analysis of alcohol degradation ability was performed on the compositions prepared in Example 1, Example 2, and Comparative Example 1.

The analysis of alcohol degradation ability was conducted by measuring the activity of alcohol dehydrogenase (ADH). To confirm the enzymatic activity of ADH, a product from BioVision was purchased and used, and for quantification after protein extraction from the samples, a BCA protein assay kit (Pierce, USA) was used. For cell culture to confirm bioactivity, a $CO_2$ incubator (NU-4750G, NUAIRE) was used, and a multi-channel spectrophotometer (SpectraMax M5, Molecular Devices, USA) was used for absorbance measurement after the cell experiment. Specifically, BNL-CL2 cells cultured using FBS, DMEM, and penicillin/streptomycin were dispensed into 24-well plates at a concentration of $1\times10^5$ cells/well and cultured for 24 hours.

Thereafter, the extract test sample of the composition prepared in Preparation Example 1 was treated at a concentration of 500 ppm, and the untreated group was used as a control group. After culturing for 24 hours, proteins were isolated and quantified. Protein content was measured by mixing 25 L of the sample, in which ADH buffer was treated to the BNL-CL2 cell protein isolated as described above, with 200 L of substrate and reaction solution, allowing the mixture to react at 37° C. for 30 minutes, and then measuring absorbance at 562 nm. The value was calculated by applying the result to a standard calibration curve prepared using bovine serum albumin (BSA). BNL-CL2 cell protein samples, ADH buffer, and substrate were added to a 96-well plate and reacted at 37° C. for 3 minutes. Thereafter, absorbance was measured at 450 nm using a spectrophotometer at 5-minute intervals for approximately 1 hour. A standard calibration curve was prepared using NADH standard solution at concentrations of 0 to 10 nmol/well, and the measured absorbance values were applied to the following equation to calculate ADH enzymatic activity. The results are shown in Table 1.

ADH activity (mU/mL)=(B/($\Delta$T×V))×dilution factor

B is the amount of NADH (nmol) measured in the sample,
T is the reaction time (minutes), and
V is the sample volume per well (mL).

TABLE 1

| Time (minutes) | Example 1 (mU/ml) | Example 2 (mU/ml) | Comparative Example 1 (mU/ml) |
| --- | --- | --- | --- |
| 5  | 10.6 ± 5.1  | 12.8 ± 5.2  | 3.4 ± 0.4 |
| 15 | 25.8 ± 10.3 | 29.1 ± 10.1 | 9.7 ± 10.9 |
| 25 | 38.1 ± 13.7 | 39.9 ± 13.1 | 15.3 ± 1.2 |
| 35 | 46.7 ± 16.0 | 49.8 ± 16.2 | 20.1 ± 1.4 |
| 45 | 54.3 ± 17.7 | 58.7 ± 17.1 | 24.3 ± 1.6 |
| 55 | 60.6 ± 18.9 | 65.5 ± 18.2 | 27.9 ± 1.8 |

According to Table 1, it was confirmed that the compositions of Examples 1 and 2 exhibited higher ADH activity compared to the composition of Comparative Example 1. Accordingly, it was confirmed that the compositions of Examples 1 and 2 exhibited excellent alcohol degradation ability in cells.

Experimental Example 2

An analysis of acetaldehyde degradation ability was performed on the compositions prepared in Examples 1 and 2 and Comparative Example 1.

Extraction treatment, cell culture, and protein quantification were performed in the same manner as in Experimental Example 1, and the sample was treated with ALDH buffer, reacted on ice for 10 minutes, and then centrifuged. Acetaldehyde was used as the substrate, and L of the sample, in which ALDH buffer was treated to the BNL-CL2 cell protein isolated as described above, was mixed with 200 L of the substrate and reaction solution in a 96-well plate, reacted at room temperature for 5 minutes, and then absorbance was measured at 450 nm using a spectrophotometer at 4-minute intervals for approximately 1 hour. A standard calibration curve was prepared using NADH standard solution at concentrations of 0 to 10 nmol/well, and the absorbance values measured from the samples were applied to the following equation to calculate ALDH enzymatic activity. The results are shown in Table 2.

ALDH activity (mU/mL)=(B/(ΔT×V))×dilution factor

B is the amount of NADH (nmol) measured in the sample,
T is the reaction time (minutes), and
V is the sample volume per well (mL).

TABLE 2

| Time (min) | Example 1 (mU/ml) | Example 2 (mU/ml) | Comparative Example 1 (mU/ml) |
|---|---|---|---|
| 4 | 15.3 ± 6.8 | 18.8 ± 5.9 | 7.5 ± 2.6 |
| 12 | 33.9 ± 13.1 | 36.8 ± 10.8 | 19.8 ± 5.9 |
| 20 | 46.1 ± 16.0 | 49.9 ± 13.7 | 29.5 ± 8.0 |
| 28 | 53.5 ± 16.7 | 56.8 ± 16.5 | 37.0 ± 9.4 |
| 36 | 57.8 ± 16.1 | 59.9 ± 17.2 | 43.0 ± 10.4 |
| 44 | 60.8 ± 15.4 | 67.6 ± 16.1 | 47.8 ± 11.1 |

According to Table 2, the compositions of Examples 1 and 2 exhibited higher ALDH activity compared to the composition of Comparative Example 1. Accordingly, it was confirmed that the compositions of Examples 1 and 2 exhibited excellent acetaldehyde degradation ability in cells.

Example 3 part by weight of a palatability enhancer was additionally mixed with 100 parts by weight of the food composition for alleviating hangover comprising plant extracts, which was prepared in Example 1.

The palatability enhancer was prepared by mixing 50 weight percent of honey extract solution, 30 weight percent of strawberry extract solution, 10 weight percent of fermented lemon balm solution, 5 weight percent of fructooligosaccharide, 3 weight percent of allulose, and 2 weight percent of xylose.

The honey extract solution was prepared by adding 500 parts by weight of purified water, 20 parts by weight of bamboo leaves, 10 parts by weight of apple, and 10 parts by weight of pear to 100 parts by weight of honey, and heating at 95° C. for 1 hour.

The strawberry extract solution was prepared by immersing strawberries in magnetized water at 20° C. for 10 minutes, adding 1,000 parts by weight of Aronia extract solution to 100 parts by weight of the strawberries immersed in the magnetized water, performing reflux extraction at 90° C. for 4 hours, and then filtering.

The Aronia extract solution was prepared by adding 800 parts by weight of purified water to 100 parts by weight of Aronia, reflux-extracting for 5 hours, and filtering.

The fermented lemon balm solution was prepared by adding 900 parts by weight of purified water to 100 parts by weight of lemon balm, heating at 100° C. for 30 minutes, and filtering to obtain a lemon balm extract solution, and then adding 10 parts by weight of fermented blueberry solution to 100 parts by weight of the lemon balm extract solution, fermenting at 25° C. for 10 hours, and filtering.

The fermented blueberry solution was prepared by mixing 50 weight percent of blueberry and 50 weight percent of isomaltooligosaccharide, and fermenting at 25° C. for 3 days.

Experimental Example 3

A palatability evaluation was performed on the compositions prepared in Examples 1 and 3 and Comparative Example 1. The palatability evaluation was conducted on 50 adults aged 20 to 50 who had prior experience with drinking hangover relief beverages. The subjects were instructed to evaluate the taste, aroma, swallowing sensation, and overall palatability of the compositions prepared in Examples 1 and 3 and Comparative Example 1 using a 5-point scale. The results of the sensory evaluation were averaged and are shown in Table 3.

TABLE 3

| | Taste | aroma | Swallowing Sensation | Overall Palatability |
|---|---|---|---|---|
| Example 1 | 4.31 | 4.12 | 4.26 | 4.28. |
| Example 3 | 4.74 | 4.51 | 4.56 | 4.62 |
| Comparative Example 1 | 3.71 | 3.73 | 3.43 | 3.79 |

According to Table 3, it was confirmed that the compositions of Examples 1 and 3 exhibited superior taste, aroma, swallowing sensation, and overall palatability compared to the composition of Comparative Example 1.

Example 4

0.5 part by weight of a natural preservative was additionally mixed with 100 parts by weight of the food composition for alleviating hangover comprising plant extracts, which was prepared in Example 1.

The natural preservative was prepared by mixing 80 weight percent of fermented garlic solution and 20 weight percent of fermented deodeok solution.

The fermented garlic solution was prepared by adding 600 parts by weight of purified water to 100 parts by weight of garlic, heating at 120° C. for 20 minutes, and filtering to obtain a garlic extract solution, and then adding 3 parts by weight of fermented raspberry solution to 100 parts by weight of the garlic extract solution, fermenting at 25° C. for 10 hours, and filtering.

The fermented raspberry solution was prepared by mixing 100 parts by weight of raspberry juice and 10 parts by weight of yeast, and fermenting at 30° C. for 24 hours.

The fermented deodeok solution was prepared by adding 200 parts by weight of ginkgo leaf extract solution to 100 parts by weight of deodeok, extracting at 1.5 atm and 100° C. for 2 hours to obtain a deodeok extract solution, and then adding 10 parts by weight of Korean black raspberry starter to 100 parts by weight of the deodeok extract solution, fermenting at 25° C. for 10 hours, and filtering.

The ginkgo leaf extract solution was prepared by adding 800 parts by weight of 90% ethanol (v/v) to 100 parts by weight of ginkgo leaves, standing at 15° C. for 12 hours, and filtering.

The Korean black raspberry starter was prepared by adding 100 mL of sterilized water to 100 g of Korean black raspberry, pulverizing with a grinder, juicing, and filtering to obtain a Korean black raspberry extract solution, preparing a medium by mixing corn flour and galactose at a weight ratio of 1:1; and then adding 50 parts by weight of the Korean black raspberry extract solution to 100 parts by weight of the medium, and fermenting at 25° C. for 10 days.

Experimental Example 4

An experiment was conducted to measure the preservative activity of the compositions of Example 4 and Comparative Example 1.

The experiment was performed using the paper disc method, and the strains used were *Escherichia coli*, *Staphylococcus aureus*, and *Candida albicans*.

Each of the cultured strains was dispensed by applying 100 L onto a solidified agar plate and was uniformly spread using a spreader. Each composition to be tested was absorbed onto a paper disk having a diameter of 10 mm in an amount of 60 L. Thereafter, the solvent was evaporated, and the disk was brought into close contact with the surface of the agar plate on which the strain had been spread, followed by incubation in an incubator at 30° C. for 48 hours. Subsequently, the antibacterial effect was confirmed by measuring the diameter (mm) of the inhibition zone formed around the paper disk, and the results are shown in Table 4.

TABLE 4

|  | Example 4 | Comparative Example 1 |
|---|---|---|
| *Escherichia coli.* | 16 | 5 |
| *Staphylococcus aureus* | 14 | 4 |
| *Candida albicans* | 16 | 6 |

According to Table 4, the composition of Example 4 exhibits superior preservative and antimicrobial effects compared to the composition of Comparative Example 1.

What is claimed is:

1. A food composition for alleviating hangover comprising plant extracts,
    comprising 1 to 3 parts by weight of a hangover alleviating promoter added to 100 parts by weight of a mixture including 9 weight percent of persimmon extract solution, 9 weight percent of citrus peel extract solution, 9 weight percent of mugwort extract solution, 10 weight percent of goji berry extract solution, 9 weight percent of buckwheat extract solution, 9 weight percent of onion extract solution, 9 weight percent of arrowroot extract solution, 8 weight percent of soybean sprout extract solution, 8 weight percent of licorice extract solution, 4 weight percent of *Astragalus* extract solution, 4 weight percent of *Schisandra* extract solution, 4 weight percent of jujube extract solution, 4 weight percent of citron peel extract solution, and 4 weight percent of lemon peel extract solution;
    wherein the hangover alleviating promoter comprises 70 weight percent of fermented lotus seed solution, 10 weight percent of pine needle extract solution, 10 weight percent of cinnamon extract solution, and 10 weight percent of Chinese artichoke extract solution;
    wherein the fermented lotus seed solution is prepared by:
    adding 20 parts by weight of banana to 100 parts by weight of purified water and heating at 105° C. for 30 minutes to obtain a banana extract solution;
    adding 10 parts by weight of lotus seed to 100 parts by weight of the banana extract solution and immersing for 1 hour to obtain a lotus seed immersion solution;
    adding 3 parts by weight of alpha-amylase to 100 parts by weight of the lotus seed immersion solution and enzymatically treating at 40° C. for 2 hours; and
    adding 10 parts by weight of fermented blackberry solution to 100 parts by weight of the enzymatically treated lotus seed immersion solution, fermenting at 30° C. for 10 hours, and filtering;
    wherein the fermented blackberry solution is prepared by mixing 60 weight percent of blackberry juice and 40 weight percent of allulose and fermenting at 30° C. for 5 days;
    wherein the pine needle extract solution is prepared by adding 50 parts by weight of 60% ethanol (v/v) to 1 part by weight of pine needle and ethanol-extracting for 24 hours;
    wherein the cinnamon extract solution is prepared by adding 10 parts by weight of purified water to 1 part by weight of cinnamon and heating at 105° C. for 3 hours; and
    wherein the Chinese artichoke extract solution is prepared by adding 10 parts by weight of purified water to 1 part by weight of Chinese artichoke and heating at 105° C. for 5 hours.

2. The food composition of claim 1,
    comprising 0.1 to 1 part by weight of a palatability enhancer added to 100 parts by weight of the mixture,
    wherein the palatability enhancer comprises 50 weight percent of honey extract solution, 30 weight percent of strawberry extract solution, 10 weight percent of fermented lemon balm solution, 5 weight percent of fructo-oligosaccharide, 3 weight percent of allulose, and 2 weight percent of xylose;
    wherein the honey extract solution is prepared by adding 500 parts by weight of purified water, 20 parts by weight of bamboo leaves, 10 parts by weight of apple, and 10 parts by weight of pear to 100 parts by weight of honey, and heating at 95° C. for 1 hour;
    wherein the strawberry extract solution is prepared by immersing strawberries in magnetized water at 20° C. for 10 minutes; and
    adding 1,000 parts by weight of *Aronia* extract solution to 100 parts by weight of the strawberries immersed in the magnetized water, reflux-extracting at 90° C. for 4 hours, and filtering;
    wherein the *Aronia* extract solution is prepared by adding 800 parts by weight of purified water to 100 parts by weight of *Aronia*, reflux-extracting for 5 hours, and filtering;
    wherein the fermented lemon balm solution is prepared by adding 900 parts by weight of purified water to 100 parts by weight of lemon balm, heating at 100° C. for 30 minutes, and filtering to obtain a lemon balm extract solution; and
    adding 10 parts by weight of fermented blueberry solution to 100 parts by weight of the lemon balm extract solution, fermenting at 25° C. for 10 hours, and filtering; and
    wherein the fermented blueberry solution is prepared by mixing 50 weight percent of blueberry and 50 weight percent of isomalto-oligosaccharide, and fermenting at 25° C. for 3 days.

3. The food composition of claim 1,
    comprising 0.5 to 2 parts by weight of a natural preservative added to 100 parts by weight of the mixture;
    wherein the natural preservative comprises 80 weight percent of fermented garlic solution and 20 weight percent of fermented deodeok solution;
    wherein the fermented garlic solution is prepared by:
    adding 600 parts by weight of purified water to 100 parts by weight of garlic, heating at 120° C. for 20 minutes, and filtering to obtain a garlic extract solution; and
    adding 3 parts by weight of fermented raspberry solution to 100 parts by weight of the garlic extract solution, fermenting at 25° C. for 10 hours, and filtering;

wherein the fermented raspberry solution is prepared by mixing 100 parts by weight of raspberry juice and 10 parts by weight of yeast, and fermenting at 30° C. for 24 hours;

wherein the fermented deodeok solution is prepared by:

adding 200 parts by weight of ginkgo leaf extract solution to 100 parts by weight of deodeok, extracting at 1.5 atm and 100° C. for 2 hours to obtain a deodeok extract solution; and adding 10 parts by weight of Korean black raspberry starter to 100 parts by weight of the deodeok extract solution, fermenting at 25° C. for 10 hours, and filtering;

wherein the ginkgo leaf extract solution is prepared by adding 800 parts by weight of 90% ethanol (v/v) to 100 parts by weight of ginkgo leaves, standing at 15° C. for 12 hours, and filtering;

wherein the Korean black raspberry starter is prepared by:

adding 100 mL of sterilized water to 100 g of Korean black raspberry, pulverizing with a grinder, juicing, and filtering to obtain a Korean black raspberry extract solution;

preparing a medium by mixing corn flour and galactose at a weight ratio of 1:1; and adding 50 parts by weight of the Korean black raspberry extract solution to 100 parts by weight of the medium and fermenting at 25° C. for 10 days.

* * * * *